(12) United States Patent
Wiersema (10) Patent No.: US 10,180,517 B2
(45) Date of Patent: Jan. 15, 2019

(54) VEHICLE MIRROR, AND METHOD FOR MANUFACTURING SUCH A MIRROR

(71) Applicant: AVIATION GLASS & TECHNOLOGY HOLDING B.V., Rhenen (NL)

(72) Inventor: Jacob Wiersema, Voorthuizen (NL)

(73) Assignee: AVIATION GLASS & TECHNOLOGY HOLDING B.V., Rhenen (NL)

(*) Notice: Subject to any disclaimer, the term of this patent is extended or adjusted under 35 U.S.C. 154(b) by 44 days.

(21) Appl. No.: 15/303,260

(22) PCT Filed: Apr. 13, 2015

(86) PCT No.: PCT/NL2015/050239
§ 371 (c)(1),
(2) Date: Oct. 11, 2016

(87) PCT Pub. No.: WO2015/156676
PCT Pub. Date: Oct. 15, 2015

(65) Prior Publication Data
US 2017/0031066 A1    Feb. 2, 2017

(30) Foreign Application Priority Data
Apr. 11, 2014   (NL) .................................. 2012607

(51) Int. Cl.
*G02B 5/08* (2006.01)
*G02B 1/14* (2015.01)
(Continued)

(52) U.S. Cl.
CPC .............. *G02B 5/0808* (2013.01); *B32B 5/02* (2013.01); *B32B 17/064* (2013.01); *B32B 27/42* (2013.01);
(Continued)

(58) Field of Classification Search
CPC .......... G02B 1/14; G02B 5/0808; B23B 5/02; B23B 17/064; B23B 27/42
(Continued)

(56) References Cited

U.S. PATENT DOCUMENTS 4,436,373 A * 3/1984 Kirsch
4,963,012 A * 10/1990 Tracy et al.
(Continued)

FOREIGN PATENT DOCUMENTS

| CN | 1705562 A | 12/2005 |
|---|---|---|
| CN | 102565901 A | 7/2012 |

(Continued)

OTHER PUBLICATIONS

International Search Report dated Jul. 17, 2015 in corresponding Application No. PCT/NL2015/050239; 4 pgs.
(Continued)

*Primary Examiner* — Ricky D Shafer
(74) *Attorney, Agent, or Firm* — Maier & Maier, PLLC (57) ABSTRACT

The invention relates to a mirror for use in and/or on a vehicle. The invention further relates to a vehicle, in particular an aircraft, comprising at least one mirror according to the invention. The invention also relates to a method for manufacturing a vehicle mirror according to the invention.

14 Claims, 3 Drawing Sheets

(51) Int. Cl.
*B64D 11/02* (2006.01)
*B32B 5/02* (2006.01)
*B32B 17/06* (2006.01)
*B32B 27/42* (2006.01)

(52) U.S. Cl.
CPC ............... *B64D 11/02* (2013.01); *G02B 1/14* (2015.01); *B32B 2262/0269* (2013.01); *B32B 2262/101* (2013.01); *B32B 2262/106* (2013.01); *Y02T 50/46* (2013.01)

(58) Field of Classification Search
USPC .................................................. 359/883, 900
See application file for complete search history.

(56) References Cited

U.S. PATENT DOCUMENTS

| | | | |
|---|---|---|---|
| 5,283,696 A | * | 2/1994 | Lanser et al. |
| 6,203,162 B1 | * | 3/2001 | Yamashita et al. |
| 2003/0004247 A1 | | 1/2003 | Destandau et al. |
| 2003/0137758 A1 | * | 7/2003 | Ikeda |
| 2006/0152834 A1 | * | 7/2006 | Kah et al. |
| 2007/0223121 A1 | * | 9/2007 | Franck et al. |
| 2011/0220097 A1 | * | 9/2011 | Ventelon et al. |
| 2012/0002311 A1 | * | 1/2012 | Bekku |
| 2012/0075734 A1 | * | 3/2012 | Martin et al. |
| 2013/0141808 A1 | * | 6/2013 | Lovegrove et al. |

FOREIGN PATENT DOCUMENTS

| | | |
|---|---|---|
| EP | 2653897 A1 | 10/2013 |
| FR | 2961609 A1 | 12/2011 |
| GB | 2 248 160 A | 3/1992 |
| WO | 2004/035308 A1 | 4/2004 |
| WO | 2012/153051 A2 | 11/2012 |
| WO | 2013/094633 A1 | 6/2013 |
| WO | 2014015840 A1 | 1/2014 |

OTHER PUBLICATIONS

International Preliminary Report on Patentability dated Oct. 12, 2016 in corresponding Application No. PCT/NL2015/050239; 45 pgs.

Office Action dated Jun. 1, 2018 in corresponding Chinese Application No. 201580029270.8; 13 pages including English-language translation.

* cited by examiner

VEHICLE MIRROR, AND METHOD FOR MANUFACTURING SUCH A MIRROR

The invention relates to a mirror for personal use, particularly for use in and/or on a vehicle. The invention further relates to a vehicle, in particular an aircraft, comprising at least one mirror according to the invention. The invention also relates to a method for manufacturing a vehicle mirror according to the invention.

Mirrors referred to in the present description generally comprise a glass sheet with a reflective metal layer deposited on the glass surface and a protective layer applied to the reflective metal. Examples of usually applied reflective metals are silver, chromium and copper. The protective layer, which is usually a paint layer, serves partially to protect the reflective metal from wear, but more particularly provides the metal with resistance to corrosion. If the reflective metal is not given such an anti-corrosion protection, the metal then tends to undergo oxidation or be adversely affected by atmospheric contaminants, this resulting in the mirror becoming tarnished and discoloured, and therefore in a reduction of the specular, reflective properties of the mirror. Water, salts and/or other contaminants can moreover get in between the glass sheet and the reflective metal layer, which results in distortion and/or reduction of the reflection.

Mirrors for personal use generally have a planar geometry and are used daily as cosmetic mirror and/or as safety mirror. In the case of a flat mirror the image generated by the mirror is the same size as the original. A significant drawback of the known mirrors is that they have a relatively low impact resistance and therefore break relatively easily. A further drawback of the known mirrors is that they are generally relatively heavy.

The above stated drawbacks make the mirrors less suitable for application in vehicles, since this increases the weight of the vehicles and thereby the energy consumption, and moreover results in undesired splintering in the vehicle if the mirror were to break.

A first object of the invention is to provide an improved mirror with which at least one of the above stated drawbacks can be obviated.

A second object of the invention is to provide a mirror with a reduced weight.

A third object of the invention is to provide a mirror which has an increased impact resistance.

At least one of the above stated objectives can be achieved by providing a mirror of the type stated in the preamble, comprising a laminate of: at least one hardened glass sheet with a maximum thickness of 1.25 mm; at least one fastening layer connected directly or indirectly (via one or more (intermediate) layers) to the glass sheet, at least one mirror layer arranged between the glass sheet and the fastening layer, wherein the fastening layer is manufactured at least partially from at least one fibre-reinforced polymer, preferably a fibre-reinforced thermosetting polymer. The fastening layer is configured to adhere to one or more adjoining layers, in particular the glass sheet and/or the mirror layer. It is also possible to envisage the fastening layer optionally additionally being adhered to one or more optional layers other than the mirror layer between the glass sheet and the fastening layer.

The actual fastening is generally realized during the laminating process. Because the mirror according to the invention comprises a laminate of mutually connected, generally adhered material layers, a substantial increase in impact resistance can be realized, whereby in the case of an impact on the ultra-thin glass sheet—i.e. the front side (foremost layer) of the mirror—splintering (decomposition) of the relevant hardened, ultra-thin glass sheet and the laminate can be prevented, this being particularly advantageous from a safety viewpoint.

This impact resistance can be further increased in that the glass sheet is ultra-thin, with a thickness of less than or equal to 1.25 mm, in particular 0.95 mm, and is subjected to a hardening process for the purpose of strengthening the glass structure.

In addition, the impact resistance of the mirror according to the invention is increased considerably by strengthening of the applied fastening layer by manufacturing this fastening layer at least partially from at least one reinforced (strengthened) fastening material, in particular a fibre-reinforced polymer. The fastening layer can therefore also be deemed a strengthened fastening layer or as a strengthening fastening layer. The fastening layer generally has the primary functionality of adhering itself or being adhered to one or more other layers of the mirror, and is additionally strengthened in order to increase the strength of the mirror without additional structures or layers being required for this purpose.

In addition to the exceptionally good impact resistance of the mirror according to the invention, the weight of the mirror is limited in that on the one hand an ultra-thin glass sheet is applied and it has been found on the other that only a (thin) fibre-reinforced polymer rear layer provides the mirror with sufficient strength to impart a self-supporting capacity and sufficient stiffness (form retention) thereto, whereby as stated no additional strengthening structures need be applied. This high impact resistance combined with a relatively limited weight make the mirror exceptionally suitable for application in or on a vehicle, in particular an aircraft. It will be apparent that the mirror can also be applied at a location other than in/on a vehicle, for instance indoors.

Within the context of this patent specification a mirror is understood to mean particularly, though not exclusively, a mirror intended for personal use. This means that a person can look in the mirror and will see an image. This image can be an image of themselves, whereby the mirror is particularly suitable as cosmetic mirror and/or safety mirror. If the person sees an image other than an image of him/herself, the mirror will be particularly suitable for application as safety mirror.

The thickness of the glass sheet is preferably less than or equal to 1 8 mm, preferably less than or equal to 1.25 mm, and more preferably amounts to 0.95 mm or 1.0 mm. A greater glass thickness (>1.8 mm) is undesirable because of the relatively large fragments formed in the case of breakage. The glass thickness preferably amounts to at least 0 4 mm, on the one hand to impart sufficient strength to the glass sheet, which enhances the optical character of the glass sheet. A glass thickness of 0.95 mm, or at least between 0.9 and 1 0 mm, is particularly suitable from an optical viewpoint, while the fragment size in the case of an impact is such that the fragments remain adhered to the fastening layer, this being particularly advantageous from a safety viewpoint. If the optical quality is a less critical factor during the design process, the glass sheet can also have a limited thickness, such as a typical thickness of 0.7 mm or less (0.3; 0.4; or 0.55 mm). The length and width of the glass sheet can vary. The edge of the glass sheet can be polished and/or ground in order to enable increased safety in handling of the mirror.

Several advantageous embodiments of the mirror according to the invention will be described hereinbelow by way of illustration. Use is made in some embodiments of several inventive concepts. It is possible to envisage individual inventive concepts and technical measures being applied without all details of a determined embodiment also being applied therein.

It will be apparent that diverse modifications to the embodiments described below can be envisaged by a skilled person, wherein a skilled person can combine different inventive concepts and/or technical measures of different embodiments without departing from the inventive concept described in the appended claims.

At least one polymer of the fastening layer can be formed by a thermoplastic. It is however generally recommended that at least one polymer of the fastening layer is formed by a thermosetting polymer (thermoset). A thermosetting polymer provides the mirror with additional strength and impact resistance, particularly in that thermosetting polymers do not become softer when heated and retain their stiffness, this in contrast to thermoplastics.

Found to be particularly suitable is a fastening layer comprising at least one fibre-reinforced polymer, wherein the polymer is formed by a thermosetting polymer, preferably a thermosetting polymer chosen from the group consisting of thermosetting polymers with a maximum optical smoke density after four minutes of 60 or less. In the context of this patent specification the maximum optical smoke density after four minutes, also referred to as $D_S(4)$, is determined in accordance with the AITM 2.0007A standard. An example of such a particularly suitable thermoset is a (synthetic) resin. The resin is preferably formed by an epoxy resin, a polyester resin and/or a phenol resin. Resins on the basis of benzoxazine and/or cyanate esters can optionally also be applied. In an advantageous embodiment of the present invention the thermosetting polymer is chosen from the group consisting of thermosetting polymers with a $D_S(4)$ of 40 or less. A thermosetting polymer is more preferably chosen from the group consisting of thermosetting polymers with a $D_S(4)$ of 40 or less, 35 or less, 30 or less, 25 or less, 20 or less, 15 or less, 10 or less or 5 or less. A particularly suitable fastening layer is obtained when the fastening layer is formed by at least one thermosetting polymer chosen from the group consisting of thermosetting polymers with a $D_S(4)$ of 35 or less.

It has been found that the use of phenol resins, such as phenol resins falling within the group of novolaks and/or resols, and phenol resin derivatives, such as phenol resin derivatives falling within the group of novolak derivatives, results in a fastening layer with particularly advantageous material properties. The group of phenol resin derivatives preferably comprises resins on the basis of cyanate esters.

Found particularly suitable in a further embodiment variant according to the present invention is a fastening layer comprising at least one fibre-reinforced polymer, wherein the polymer is formed by a thermosetting polymer having a glass temperature ($T_g$) of 100° C. or higher. The fastening layer is more preferably formed by at least one thermosetting polymer with a glass temperature of 120° C. or higher. A fastening layer with exceptionally advantageous properties is obtained when the fastening layer is formed by at least one thermosetting polymer with a glass temperature of 140° C. or higher. A fastening layer formed by a phenol resin with a glass temperature of 140° C., or a fastening layer formed by a cyanate ester with the glass temperature of about 200° C., is thus found to result in a fastening layer which can be applied for use in for instance aircraft. Applicability is understood in this patent specification to mean that the material complies with the standards set for application. In the case of fire in the immediate vicinity a thermoset with the above stated relatively high glass temperature will itself not burn, or hardly so, and will usually not even begin to produce smoke to any appreciable extent, this enhancing the fire resistance of the mirror as such, which is particularly advantageous from a safety viewpoint.

It is advantageous for the thermosetting polymer applied in the mirror to be at least partially or even substantially fully cured in order to guarantee the strength of the mirror. During curing molecular cross-links are formed between the polymer chains which result in a network polymer and consequently in (irreversible) strength. This process is also referred to as curing of the thermosetting polymer.

During lamination of layers of the mirror according to the invention use is preferably initially made of a not yet (fully) cured fibre-reinforced thermosetting polymer. This not fully cured polymer is usually stored at relatively low temperatures, such as for instance −20° C., in order to prevent curing of the polymer as far as possible. A thermosetting polymer which is not yet cured is generally (to some extent) flexible, sometimes even somewhat gel-like, which facilitates handling of the polymer, and in this non-cured state is moreover tacky, this considerably facilitating adhesion of the fastening layer to the glass plate and/or the mirror layer.

Following adhesion of the layers of the mirror to each other the mirror will generally be heated, in general to above room temperature, in order to accelerate curing of the thermosetting polymer. The temperature used here can vary, but preferably lies between 50 and 150° C., is usually around about 135° C.

During the actual laminating process for manufacturing the mirror according to the invention a pressure differing from atmospheric pressure (overpressure or underpressure) will be exerted, for instance by means of vacuum bags (for the purpose of realizing an underpressure) or an autoclave (for the purpose of realizing an overpressure).

In an alternative embodiment variant of the method for manufacturing the mirror according to the invention it is possible to envisage the fibre-reinforced thermocuring fastening layer being cured in advance, so before lamination, whereby a fibre-reinforced polymer sheet or layer is formed which can subsequently be connected, for instance by means of a separate glue layer (fastening layer or adhesive layer), to one or more adjacent layers, thus forming the mirror according to the invention.

The fibres applied in the fibre-reinforced polymer can be of diverse nature and be manufactured from diverse materials. The fibres are generally manufactured from glass, carbon and/or (para- or meta-)aramid (Kevlar). Such materials generally impart an exceptionally great strength to the fastening layer. These materials are moreover not flammable, or hardly so, this enhancing the fire resistance of the fastening layer as such.

The fibres can be separate (individual) fibres incorporated in the polymer, wherein the polymer functions in fact as substrate.

As already described above, the polymer can also be formed by a (synthetic) resin, such as for instance an epoxy resin, a polyester resin and/or a phenol resin and/or a cyanate ester. It is however generally recommended to apply in the fastening layer a fibre-based substrate (carrier) to which the at least one polymer is connected. The substrate can for instance be formed here by a fibre web (woven), a fibre lattice (two-dimensional), a fibre matrix (two-dimensional or three-dimensional) and/or other (non-woven) substrate.

This variant, wherein a fibre-based substrate is applied to which the polymer is connected, generally imparts the greatest strength to the fastening layer. Application of a fibre web in the fibre-reinforced polymer increases the strength of the fibre-reinforced polymer. The polymer is preferably at least partially (pre-)impregnated here in the fibre-based substrate (matrix). Such a structure is also referred to as a prepreg, based on a thin layer manufactured from fibre-reinforced polymer, in particular a film and/or tape. The film can be provided here with perforations for passage of polymer material.

It is however also possible to envisage the fibre-based substrate being at least partially formed by a web manufactured from fibres. A web is also an open structure through which the polymer material can move during production, thereby creating a reliable adhesion between the substrate and the polymer.

The fibre-reinforced polymer can be deemed a composite. The fibres, preferably formed by a fibre web, are incorporated here in a polymer matrix. The polymer matrix preferably substantially wholly encloses the fibres, preferably formed by a fibre web. The fibres are thus covered here substantially all the way around with polymer. The fibre-reinforced polymer is also referred to as a prepreg, an abbreviation for pre-impregnated fibres. The thickness of the fibre-reinforced polymer layer preferably lies between 0.1 and 0.5 mm. The thickness of the fibre-reinforced polymer is preferably less than or equal to the thickness of the glass sheet. The mirror as such can hereby take a relatively compact (flat) and lightweight form. The specific weight of the mirror is preferably less here than 4.8 $kg/m^2$, and more preferably less than 3.5 $kg/m^2$, in particular less than 2.8 $kg/m^2$.

The most flammable component of the mirror according to the invention is generally formed by the fastening layer comprising the at least one polymer. In order to reduce the flammability of the fastening layer, which is advantageous from a safety viewpoint, it is recommended that the fastening layer comprises at least one fire-retardant additive. This additive prevents or at least counters the spread of fire. The additive is preferably formed by an organohalogen compound. Such compounds are able to remove reactive H and OH radicals during a fire. The organohalogen compound preferably comprises bromine and/or chlorine. Recommended from a viewpoint of fire retardance over an organochlorine compound such as PCB (polychlorinated biphenyl) is an organobromine compound such as PBDE (polybrominated diphenyl ether). Other examples of applicable brominated compounds are: Tetrabromobisphenol A, Decabromodiphenyl ether (Deca), Octabromodiphenyl ether, Tetrabromodiphenyl ether, Hexabromocyclododecane (HBCD), Tribromophenol, Bis(tribromophenoxy)ethane, Tetrabromobisphenol A polycarbonate oligomer (TBBA or TBBPA), Tetrabromobisphenol A epoxy oligomer (TBBA or TBBPA), and Tetrabromophthalic acid anhydride. Other examples of applicable chlorinated compounds are: Chlorinated paraffin, Bis(hexachlorocyclopentadieno)cyclooctane, Dodecachloride pentacyclodecane (Dechlorane), and 1,2,3,4,7,8,9,10,13,13,14,14-dodecachloro-1,4,4a,5,6,6a,7,10,10a,11,12,12a-dodecahydro-1,4,7,10-dimethanodibenzo[a,e]cyclooctene (Dechlorane Plus).

Although halogenated flame retardants are particularly effective, they generally have the drawback that toxic smoke can result in the case of fire. It is therefore also possible to envisage applying one or more alternative, less toxic fire-retardant additives, including intumescent (foaming) substances. The operating principle of these alternative additives is based on formation of a foam layer which functions as oxygen barrier and therefore also has a fire-retardant effect. Such intumescent additives generally comprise melamine or a salt derived therefrom. An example hereof is a mixture of polyphosphates (acid donor) in co-action with a melamine (foaming agent) and a carbon donor such as dipentaerythritol, starch or pentaerythritol. Gaseous products such as carbon dioxide and ammonia gas are formed here in the case of fire. The formed foam layer is stabilized by cross-linking, as in the case of vulcanization.

Other examples of applicable, relatively environmentally-friendly, melamine-based additives are: melamine cyanurate, melamine polyphosphate and melamine phosphate.

In addition to the above stated additives the fastening layer can also be provided with one or more fire-retardant additives configured to prevent pyrolysis, produce (oxygen-displacing) nitrogen gas and/or produce (cooling) water in the case of fire. An example of this latter category are metal hydroxides which are converted during fire to metal oxide and water molecules, wherein the water molecules ensure that the oxygen concentration around the burning material is reduced and the fire intensity thus decreases. This reaction is moreover endothermic, so that heat is also extracted from the fire, this producing a cooling effect, whereby the fire is also retarded. An example here of a suitable metal hydroxide is aluminium hydroxide (ATH).

In a preferred embodiment the fastening layer has a maximum thickness of 0.5 mm. The thickness more preferably lies between 0.2 and 0.3 mm, and the thickness amounts particularly to 0.25 mm. Such a limited thickness has been found sufficient to make the mirror sufficiently sturdy and impact-resistant, while the weight of the fastening layer, and consequently of the mirror, can hereby remain limited.

In a preferred embodiment the fastening layer is built up of a plurality of layers, wherein at least one layer is formed by the fibre-reinforced polymer. At least one other layer can be manufactured here from another material, such as a polymer, in order to be able to improve the properties of the fastening layer. It is thus possible to envisage applying a fastening layer constructed from a first layer formed by the fibre-reinforced polymer in order to impart sufficient strength to the fastening layer, and thereby to the mirror, and from a second layer connected to the first layer and formed by a primer to enable improved adhesion of the fastening layer to the mirror layer and/or glass sheet. The primer also has a protective function here in countering corrosion of the mirror layer. An important additional functionality of the primer is to protect the mirror layer from the generally contracting fibre-reinforced polymer layer. Stress generally develops in this latter layer which could result in visible damage to the mirror layer if the intermediate primer were not applied. An example of a primer which can be applied is a two-component (2C) epoxy resin. This epoxy resin can optionally take a transparent form in order to increase the light transmission of the mirror if desired, for instance when an image or object, such as electronic display, is arranged behind the mirror. During manufacture of the mirror the primer can be applied first to the glass sheet and/or mirror layer, after which, following curing of the primer, the generally initially tacky fibre-reinforced polymer layer can be arranged on the primer.

The glass sheet is hardened in order to make the glass particularly strong and impact-resistant. What particularly takes place here is a surface hardening, which results in a compressive stress at the outer surface of the glass sheet and a tensile stress in the core of the glass sheet. Hardening of the glass can take place in both chemical and thermal manner Chemical hardening is generally recommended, wherein the (unhardened) glass is preferably immersed in a bath of molten potassium nitrate at a temperature of about 400° C. This results in chemical exchange of $K^+$ ions from the bath with the $Na^+$ ions from the glass. The $K^+$ ions (size 2.66 Å) take the place of the $Na^+$ ions (size 1.96 Å). Since they have larger dimensions they induce compressive stresses at the surface of the glass, which can thus provide more resistance. The duration of immersion determines the finally obtained stress level. The stress distribution does not take the same form as in the case of thermally hardened glass and generally results in considerably stronger glass with a higher bending strength than if unhardened glass were to be hardened in thermal manner The chemical hardening of the glass sheet can optionally take place in multiple steps, preferably in order to successively exchange different selective ions, such as sodium ions, silver ions, copper ions and/or lithium ions.

It is noted in this respect that chemically hardened glass generally has a much higher compressive stress at the surface of the glass sheet which decreases relatively quickly just beneath the surface, wherein there is a limited tensile stress in the centre (half depth) of the glass sheet, resulting in a block-shaped stress profile. Thermally hardened glass generally has a considerably lower compressive stress at the surface of the glass sheet, wherein a relatively high tensile stress is present in the centre of the glass sheet, resulting in a parabolic stress profile.

The glass applied in the glass sheet preferably comprises aluminium oxide ($Al_2O_3$), preferably in a quantity of at least 7 mol. %. It has been found that, in the case of glass comprising aluminium oxide, particularly when the quantity of aluminium oxide comprises at least 7 mol. %, the potassium ions ($K^+$ ions) will penetrate deeper into the glass sheet, on average to about 50 micrometers, which imparts to the thin glass sheet a greater and thereby improved bending strength, generally about 800 MPa. The glass sheets known from the prior art have a bending strength of about 150 MPa and a penetration depth of about 15 micrometers. The aluminium oxide content in the glass sheet as applied in the mirror according to the invention preferably lies between 7 and 15 mol. %. The increased bending strength results in a relatively strong and flexible glass which has a relatively high impact resistance and which is not susceptible to vibration at all. This makes the glass sheet particularly suitable for use in and/or on a vehicle. During curing the potassium ions will penetrate the glass sheet on two sides (on opposite (front) sides), whereby during curing potassium ions are incorporated into the glass over an overall thickness of 100 micrometers (2×50 micrometers). At a glass thickness of for instance 1 0 millimeter the overall penetration depth thus amounts to 10%. A further advantage of applying $Al_2O_3$ in the glass sheet is that the melting temperature of the glass sheet can hereby be considerably increased, which is an additional advantage from the viewpoint of fire safety.

The mirror layer can take diverse forms. It is possible here to envisage the mirror layer being embodied as a film reflective on at least one side. An advantage of a film is that the layer thickness of the mirror layer is substantially homogenous, which will enhance homogenous reflection of the mirror. It is also possible to envisage a (thin) metal (oxide) layer being arranged on another layer of the laminate, this other carrier layer preferably being formed by the glass sheet. Examples of suitable metals are copper, silver, gold, nickel, aluminium, Beryllium, chrome, molybdenum, platinum, rhodium, tungsten and titanium.

The metal layer can be arranged on the carrier layer, in particular the glass sheet, by means of vacuum vapour deposition techniques and/or sputtering. The arranged metal layer can optionally be at least partially removed, for instance by means of sandblasting, in order to make a part of the mirror wholly or semi-transparent and/or to impart a satinized (matt) appearance to the mirror. This makes it possible to generate visual effects behind the mirror layer, for instance in a separate material layer, which will be visible via the semi-transparent mirror to persons looking in the mirror. The above stated examples of the mirror layer are embodiments wherein the (static) mirror layer takes a permanently specular form.

In a preferred embodiment a side of the mirror layer remote from the glass sheet is at least partially provided with a coating which protects the mirror layer. The coating is particularly advantageous when the mirror layer is formed by a metal layer so that oxidation of the metal layer can be prevented or at least countered. If the mirror layer is formed by a copper layer, it is for instance possible to envisage covering the copper layer with an inhibitor on the basis of for instance azole derivative. Further details hereof are described in the British patent GB1074076. The use of azole-based inhibitors has resulted in a discernible improvement in preventing or retarding the appearance of a haze by preventing oxidation of the copper and consequently also of an optional underlying layer of silver. The coating can also be applied to the peripheral edge(s) of the mirror layer in order to also protect the end surface against corrosion.

It is however also possible to envisage the mirror layer taking a semi-permanent (temporarily) specular form. The mirror layer can generally be made specular as desired here. This is possible for instance by having at least a part of the mirror layer formed by an electrochromic layer. Connecting the electrochromic layer, optionally on the basis of liquid crystals (LCD), to an electrical energy source such as a battery enables the layer to be charged, whereby the specular layer can be activated or deactivated. The electrochromic layer can optionally be co-laminated during the production process. Later assembly of such a layer with the already formed laminate can also be envisaged. It is possible to envisage positioning the thermochromic layer behind an optionally non-specular, optionally made non-specular, part of the mirror, particularly of the glass sheet.

The light transmission of the mirror layer depends on the type of mirror layer applied and the intended use of the mirror. This light transmission will generally lie between 10% and 80%. This means that the maximum reflectivity of the mirror layer will generally lie between 20% and 90%. The thickness of the mirror layer also depends on the type of mirror layer used, wherein the thickness of for instance a metal layer generally lies in the order of magnitude of 70-100 nanometers for an opaque mirror and can be even smaller in the case of (semi-)light-transmitting mirrors, while an electrochromic layer generally lies in the order of magnitude of micrometers up to several millimeters, typically between 10 micrometers and 2 millimeters.

The coating preferably has a temperature resistance of at least 130° C., more preferably at least 150° C. This makes it possible to keep the coating fully intact during lamination of the different material layers of the mirror. This laminating process generally takes place at about 130-135° C.

It is generally advantageous for the laminate to comprise an adhesive layer for attaching the laminate to or on a bearing structure such as a wall, ceiling or piece of furniture. The adhesive layer will initially be covered by means of a cover film which will be removed just before the mirror is arranged on the bearing structure.

It is possible to envisage the mirror already being attached to a bearing structure, such as for instance a further strengthening plate, although this will generally not be technically essential. This bearing structure can here form part of the mirror according to the invention. It is possible here to envisage the strengthening plate being manufactured from a material comprising fibre, such as an aramid fibre, in particular Kevlar®, a material comprising carbon, or a grid, such as a metal grid or a plastic grid, for instance provided with a honeycomb structure. A honeycomb structure is generally relatively light in weight, while such a structure is nevertheless relatively strong and sturdy. In a preferred embodiment of the mirror the mirror comprises a bearing structure with a honeycomb structure which is enclosed by two fibre-reinforced polymer layers, wherein one of the above stated fibre-reinforced polymer layers forms part of the fastening layer of the mirror. The exact composition of the fibre-reinforced polymer layers can differ from each other here. The thickness of the bearing structure can vary, but preferably lies between 1.5 and 20 millimeters. Velcro or adhesive tape can optionally be arranged on a rear side of the rear fibre-reinforced polymer layer to enable easy attachment of the mirror.

It is also possible to envisage the mirror comprising at least one additional material layer positioned on a front side of the fastening layer remote from the glass sheet, wherein the at least one additional material layer is preferably chosen from the group consisting of: a decorative layer, a coloured layer, an additional fastening layer, an electronic layer, a light-reflecting layer and an additional glass sheet. It is usually advantageous here for the additional material layer to take an at least partially transparent form, whereby it is optionally possible to look through the mirror.

The mirror according to the invention will generally have a substantially planar geometry. It is however possible to envisage the mirror having a single or multiple curve geometry in order to intentionally manipulate the mirrored image, which can be advantageous in determined situations.

The invention also relates to a vehicle, in particular an aircraft, comprising at least one mirror according to the invention. The mirrors can serve additionally here as glazing, video screen, as touchscreen or combinations thereof. Vehicles are understood to mean, among others, motorbikes, automobiles, vessels and aircraft.

The invention further relates to a method for manufacturing a mirror for a vehicle, comprising the steps of: A) providing at least one hardened glass sheet with a maximum thickness of 1.25 mm, B) arranging a mirror layer on at least one front side of the glass sheet, C) laying against each other the glass sheet provided with the mirror layer, and at least one fastening layer, wherein the fastening layer comprises at least one fibre-reinforced polymer, and D) laminating by means of heating the assembly formed during step C), thus forming the mirror. The fastening layer arranged during step C) preferably comprises at least one not fully cured thermosetting polymer, which thermosetting polymer is at least partially and preferably substantially fully cured during step D). The not fully cured thermosetting polymer will generally be relatively flexible and moreover tacky, this generally enhancing the adhesive process during step D). Curing takes place during step D), whereby the mirror acquires a permanent rigidity (strength) and impact resistance. When the fastening layer is constructed from a plurality of (sub-)layers, step C) can optionally be performed in phases, wherein the different (sub-)layers of the fastening layer are arranged successively.

The invention will be elucidated on the basis of non-limitative exemplary embodiments shown in the following figures. Herein.

Figure 1:
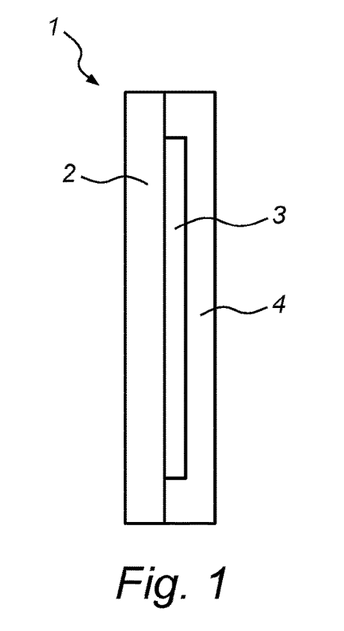
FIG. 1 shows a side view of a laminate according to a first embodiment of a mirror according to the invention.

FIG. 1 shows a side view of a laminate according to a first embodiment of a mirror (1) according to the invention. Mirror (1) comprises in this exemplary embodiment a chemically hardened thin glass sheet (2) with a thickness of 1.25 mm or less, in particular a thickness of 0.95 mm or less. Arranged on glass sheet (2) is a mirror layer (3), for instance a vapour-deposited specular metal layer (3). Mirror layer (3) is enclosed between glass sheet (2) and a fastening layer of fibre-reinforced material (4). The layer of fibre-reinforced material (4) is for instance formed by a fibre-reinforced polymer such as polyester.

The fibre-reinforced polymer (4) is for instance a resin type which cures by means of baking at an increased temperature. This makes it possible to arrange glass (2) and mirror layer (3) on polymer (4), after which the whole cures to a strong entity in an oven at for instance 135° C. in a number of hours. Polymer (4) is for instance a thermosetting polymer (4) which remains in shape after curing.

Stated only by way of example is that glass sheet (2) can be manufactured from: 64-68 mol. % $SiO_2$; 12-16 mol. % $Na_2O$ ; 8-12 mol. % $Al_2O_3$; 0-3 mol. % $B_2O_3$; 2-5 mol. % $K_2O$; 4-6 mol. % MgO; and 0-5 mol. % CaO, wherein: 66 mol. %≤$SiO_2+B_2O_3+CaO$≤69 mol. %; $Na_2O+K_2O+B_2O_3+MgO+CaO+SrO$>10 mol. %; 5 mol. %≤$MgO+CaO+SrO$≤8 mol. %; ($Na_2O+B_2O_3$)–$Al_2O_3$≤2 mol. %; 2 mol. %≤$Na_2O-Al_2O_3$≤6 mol. %; and 4 mol. %≤($Na_2O+K_2O$)–$Al_2O_3$≤10 mol. %. A preferred embodiment of the composition of soda-lime glass to be used is shown in the following table:

| | Preferred percentage (Mol %) | Preferred range (Mol %) |
|---|---|---|
| $SiO_2$ | 71.86 | 63-81 |
| $Al_2O_3$ | 0.08 | 0-2 |
| MgO | 5.64 | 0-6 |
| CaO | 9.23 | 7-14 |
| $Li_2O$ | 0.00 | 0-2 |
| $Na_2O$ | 13.13 | 9-15 |
| $K_2O$ | 0.02 | 0-1.5 |
| $Fe_2O_3$ | 0.04 | 0-0.6 |
| $Cr_2O_3$ | 0.00 | 0-0.2 |
| $MnO_2$ | 0.00 | 0-0.2 |
| $Co_3O_4$ | 0.00 | 0-0.1 |
| $TiO_2$ | 0.01 | 0-0.8 |
| $SO_3$ | 0.00 | 0-0.2 |
| Se | 0.00 | 0-0.1 |

It is also possible to envisage, and generally more advantageous, using glass with the following composition:

|  | Preferred range (Mol %) |
| --- | --- |
| $SiO_2$ | 61-75 |
| $Al_2O_3$ | 7-15 |
| MgO | 0-7 |
| CaO | 0-3 |
| $Na_2O$ | 9-21 |
| $K_2O$ | 0-4 |
| $B_2O_3$ | 9-21 |

The above stated composition can of course be modified, and components can be omitted and/or added to the above stated composition. The presence of $Al_2O_3$ increases the penetration depth of potassium ions during chemical hardening, and this can significantly improve the bending strength of the glass.

The glass is chemically hardened in order to make the glass particularly strong. The (unhardened) glass is preferably immersed here in a bath of molten potassium nitrate at a temperature of about 400° C. This results in chemical exchange of $K^+$ ions from the bath with the $Na^+$ ions from the glass. The $K^+$ ions (size 2.66 Å) take the place of the $Na^+$ ions (size 1.96 Å). Since they have larger dimensions they induce compressive stresses at the surface of the glass, which can thus provide more resistance. The duration of immersion determines the finally obtained stress level. The stress distribution does not take the same form as in the case of thermally hardened glass and results in considerably stronger glass than if unhardened glass were to be hardened in thermal manner It is noted in this respect that chemically hardened glass generally has a much higher compressive stress at the surface of the glass sheet which decreases relatively quickly just beneath the surface, wherein there is a limited tensile stress in the centre (half depth) of the glass sheet, resulting in a block-shaped stress profile. Thermally hardened glass generally has a considerably lower compressive stress at the surface of the glass sheet, wherein a relatively high tensile stress is present in the centre of the glass sheet, resulting in a parabolic stress profile.

Figure 2:
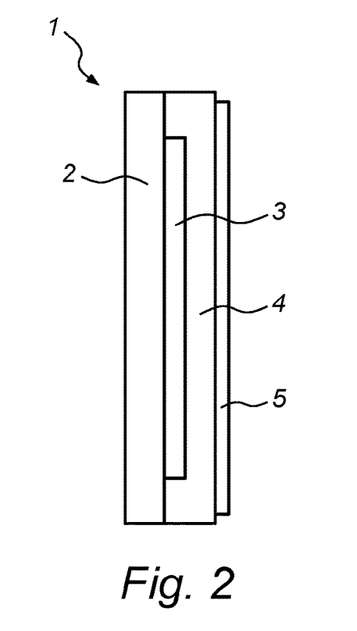
FIG. 2 shows a side view of a laminate according to FIG. 1 provided with an additional fastening layer.

FIG. 2 shows a mirror (1) according to FIG. 1 comprising a chemically hardened thin glass sheet (2), a mirror layer (3), a strengthening fastening layer of fibre-reinforced material (4) as well as an optionally double-sided fastening layer (5) for attaching the mirror laminate to another structure such as a bearing structure. It is possible to envisage applying one or more alternative attaching elements instead of a fastening layer (5).

Figure 3:
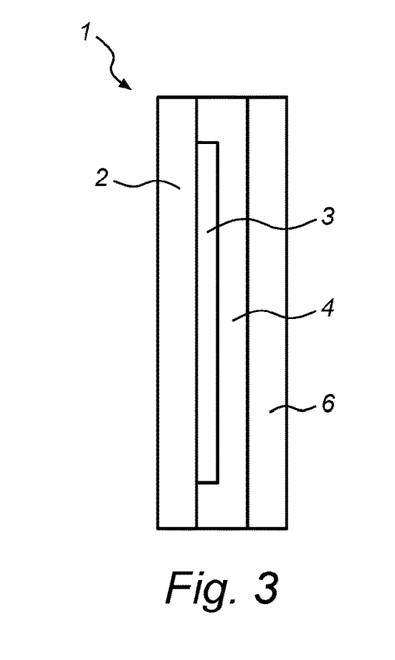
FIG. 3 shows a side view of a laminate according to FIG. 1 provided with an additional support.

FIG. 3 shows a mirror (1) according to FIG. 1 comprising a chemically hardened thin glass sheet (2), a mirror layer (3), a fastening layer of fibre-reinforced material (4) as well as a support (6). The support is for instance connected by means of the layer of fibre-reinforced material (4) to glass sheet (2) and mirror layer (3).

Figure 4:
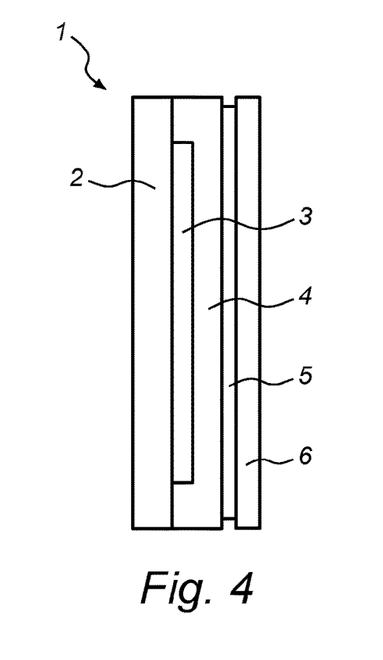
FIG. 4 shows a side view of a laminate according to FIG. 2 provided with an additional support.

FIG. 4 shows a mirror (1) according to FIG. 2 comprising a chemically hardened thin glass sheet (2), a mirror layer (3), a fastening layer of fibre-reinforced material (4) as well as a support (6). The support is connected by means of a fastening layer (5) to the layer of fibre-reinforced material (4).

Figure 5:
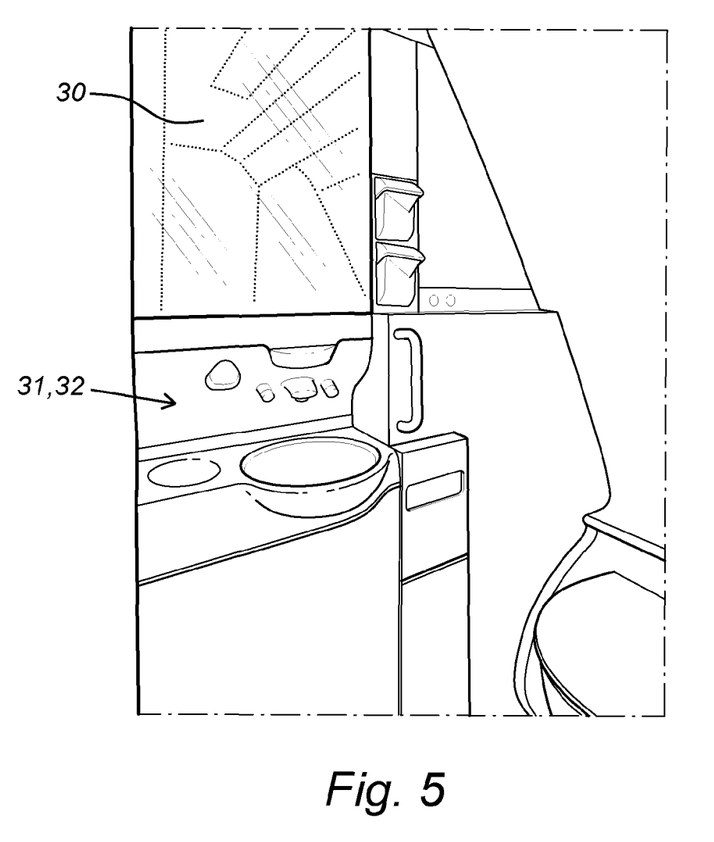
FIG. 5 shows a perspective view of the application of a mirror according to the invention in a sanitary space of a vehicle.

FIG. 5 shows a perspective view of the application of a mirror (30) according to the invention in a sanitary space (31) of a vehicle (32), such as an aircraft, boat or bus. In addition to being light in weight and having a relatively high impact resistance, additional advantages of the applied mirror according to the invention are the high degree of scratch-resistance and having a uniform thickness, whereby the light refraction is likewise relatively uniform, this enhancing the image reflection of mirror 30.

Figure 6:
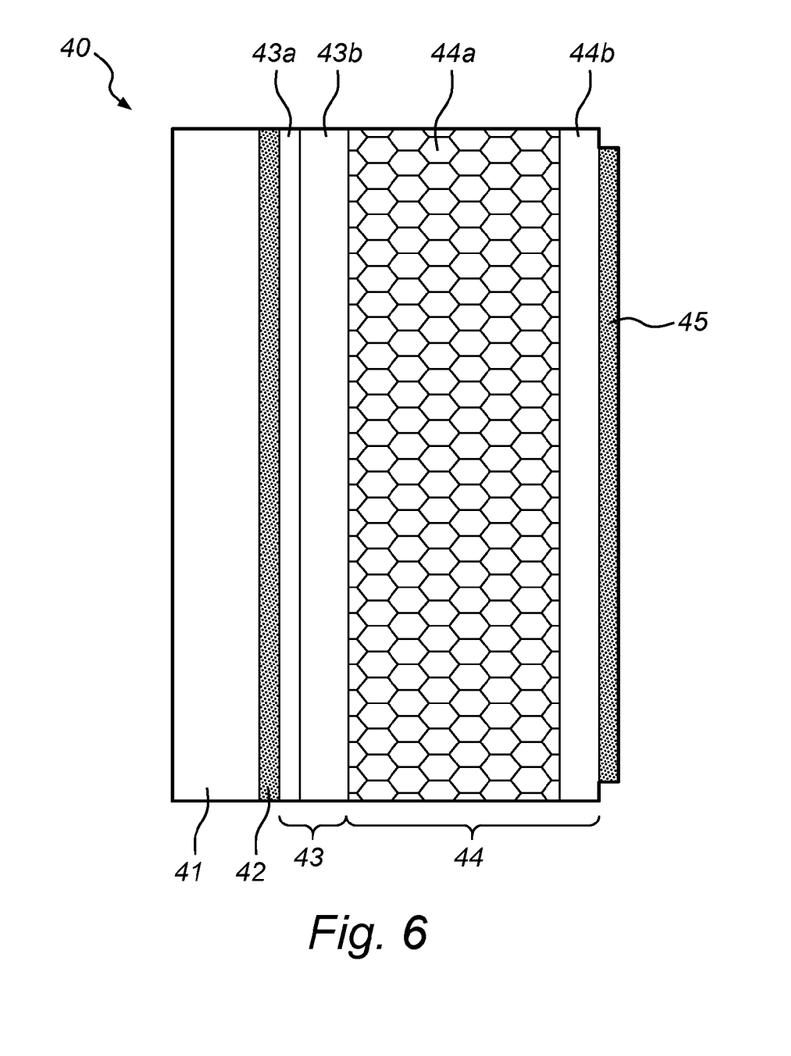
FIG. 6 shows a schematic cross-section of another mirror (40) according to the invention.

FIG. 6 shows a schematic cross-section of another mirror (40) according to the invention. Mirror (40) comprises an ultra-thin glass sheet (41) with a thickness equal to or less than 1.25 mm. Glass sheet (41) comprises 10-15 mol. % $Al_2O_3$, this enabling a deeper penetration of potassium ions during curing, whereby relative bending strength and impact resistance is imparted to the glass sheet. The edges of glass sheet (41) are polished. In this embodiment glass sheet (41) has a standard height of 2 meters and a width of 1.5 meters, and can be reduced in size by means of cutting. The glass sheet is generally supplied unhardened. Before glass sheet (41) is chemically hardened, the glass sheet is cleaned. This cleaning takes place in multiple steps, wherein glass sheet (41) is arranged in a plurality of immersion baths, including at least one immersion bath filled with demineralized water and at least one immersion bath filled with dissolved caustic soda. Following treatment/cleaning of glass sheet (41) the glass sheet is cleaned manually. Glass sheet (41) is then chemically hardened by making use of dissolved $KNO_3$. The hardened glass sheet is subsequently cleaned again, among other ways by applying the above stated immersion baths and/or by means of applying an ultrasonic immersion bath.

Following preparation of glass sheet (41) a mirror layer (42) is arranged, generally by making use of a vacuum vapour deposition technique, such as for instance PVD (Physical Vapour Deposition). In this exemplary embodiment it is manufactured from metal, in particular aluminium, silver, titanium or chromium. The thickness of this mirror layer (42) is less than 1 micrometer. Mirror layer (42) continues as far as the edge of glass sheet (41). A fastening layer (43) built up of two layers is then arranged on mirror layer (42). A first layer (43a) of fastening layer (43) is formed by a primer arranged directly onto mirror layer (42). The primer (43a) adheres well to mirror layer (42) and protects mirror layer (42) from damage and corrosion. The primer (43a) is formed in this exemplary embodiment by a two-component epoxy resin which can be applied as a kind of paint to the (whole) mirror layer (42). Primer (43a) is generally arranged by means of spraying and/or rolling so that a preferably even covering layer is obtained. After being arranged the primer (43a) has to cure. This curing process can take several days. Once the primer (43a) has cured, a second layer (43b) of the fastening layer can be arranged which is formed by a fibre-reinforced polymer, also referred to as prepreg. The polymer used as substrate or matrix in this second layer (43b) is preferably formed by a cyanate ester or a phenol resin, such as phenol formaldehyde, in particular Bakelite®, as it has been found that this thermosetting material is particularly fire-resistant and does not produce smoke, or hardly so, in the case of fire in the immediate vicinity. A web (mat) of glass fibres is preferably applied as fibre. The polymer is initially not yet fully cured, this enhancing the flexibility, and thereby handling, of the polymer. Owing to this initially not fully cured state the polymer will generally be of a tacky nature initially. In order to prevent premature curing and/or drying it is advantageous to initially store the fibre-reinforced polymer in cool state, preferably at a temperature of less than 0 degrees Celsius. After the initially tacky fibre-reinforced polymer (43b) has been arranged on primer (43a), the fibre-reinforced polymer (43a) is covered by means of a structure, such as for instance wool, which absorbs polymer, in particular resin, after which the created laminate is arranged in a vacuum oven in order to cure the fibre-reinforced polymer (43b). Formation of gas occurs during this curing process. The formed gases are immediately discharged. The primer (43a) protects mirror layer (42) from stress which develops in the fibre-reinforced polymer (43b). After curing of the laminate in the vacuum oven, the cured laminate is provided with a bearing structure (44) which is constructed from a honeycomb structure (44a) with a thickness of 2-13 mm, and a (cured) fibre-reinforced polymer layer (44b) which is connected to the honeycomb structure (44a) and the polymer of which is preferably also of a fire-resistant and low-smoke nature. A rear side of mirror (40), formed by a rear side of the rearmost fibre-reinforced polymer layer (44b), is preferably provided with velcro (45) or tape, whereby the mirror can be installed quickly and easily. Bearing structure (44) is optional and can if desired optionally be omitted.

It will be apparent that the invention is not limited to the exemplary embodiments shown and described here, but that within the scope of the appended claims numerous variants are possible which will be self-evident to the skilled person in this field.

The invention claimed is:

1. Vehicle mirror for personal use, comprising a laminate of:
    at least one hardened glass sheet with a maximum thickness of 1.25 mm;
    at least one fastening layer connected to the glass sheet; and
    at least one mirror layer arranged between the glass sheet and the fastening layer,
wherein the fastening layer comprises at least one fibre-reinforced thermosetting polymer, and the fastening layer is constructed from a plurality of layers, wherein at least one layer is formed by the fibre-reinforced polymer and at least one other layer is formed by a primer manufactured from epoxy resin, which is arranged directly on at least one of the mirror layer and the glass sheet.

2. Mirror as claimed in claim 1, wherein the polymer is chosen from the group consisting of thermosetting polymers with a maximum optical smoke density after four minutes of 60 or less.

3. Mirror as claimed in claim 1, wherein the themosetting polymer has a glass temperature of 100° C. or higher.

4. Mirror as claimed in claim 1, wherein the polymer is at least partially cured.

5. Minor as claimed in claim 1, wherein the fibre-reinforced polymer comprises at least one of glass fibres, carbon fibres and aramid fibres.

6. Minor as claimed in claim 1, wherein the fibre-reinforced polymer comprises a fibre-based substrate to which the polymer is connected.

7. Mirror as claimed in claim 6, wherein the polymer is at least partially impregnated in the fibre-based substrate.

8. Minor as claimed in claim 6, wherein the fibre-based substrate is formed by a web manufactured from fibres.

9. Minor as claimed in claim 1, wherein the fastening layer has a maximum thickness of 0.5 mm.

10. Mirror as claimed in claim 1, wherein the glass sheet is chemically hardened.

11. Vehicle mirror for personal use, comprising a laminate of:
    at least one hardened glass sheet with a maximum thickness of 1.25 mm;
    at least one fastening layer connected to the glass sheet and
    at least one mirror layer arranged between the glass sheet and the fastening layer,
wherein the fastening layer comprises at least one fibre-reinforced thermosetting polymer, and wherein the polymer comprises at least one of a phenol resin and phenol resin derivative.

12. Vehicle minor for personal use, comprising a laminate of:
    at least one hardened glass sheet with a maximum thickness of 1.25 mm;
    at least one fastening layer connected to the glass sheet and
    at least one mirror layer arranged between the glass sheet and the fastening layer,
wherein the fastening layer comprises at least one fibre-reinforced thermosetting polymer, and wherein the polymer comprises at least one of a phenol resin and a phenol resin on a basis of cyanate ester.

13. Method for manufacturing a vehicle minor, comprising the steps of:
    A) providing at least one hardened glass sheet with a maximum thickness of 1.25 mm,
    B) arranging a minor layer on at least one front side of the glass sheet,
    C) laying against each other the glass sheet provided with the minor layer, and at least one fastening layer, wherein the fastening layer comprises at least one fibre-reinforced thermosetting polymer, and wherein the polymer comprises at least one of a phenol resin and phenol resin derivative,
    D) laminating by means of heating the assembly formed during step C), thus forming the mirror.

14. Method as claimed in claim 13, wherein the fastening layer arranged during step C) comprises at least one not fully cured thermosetting polymer, wherein the thermosetting polymer is at least partially cured during step D).

* * * * *